UNITED STATES PATENT OFFICE.

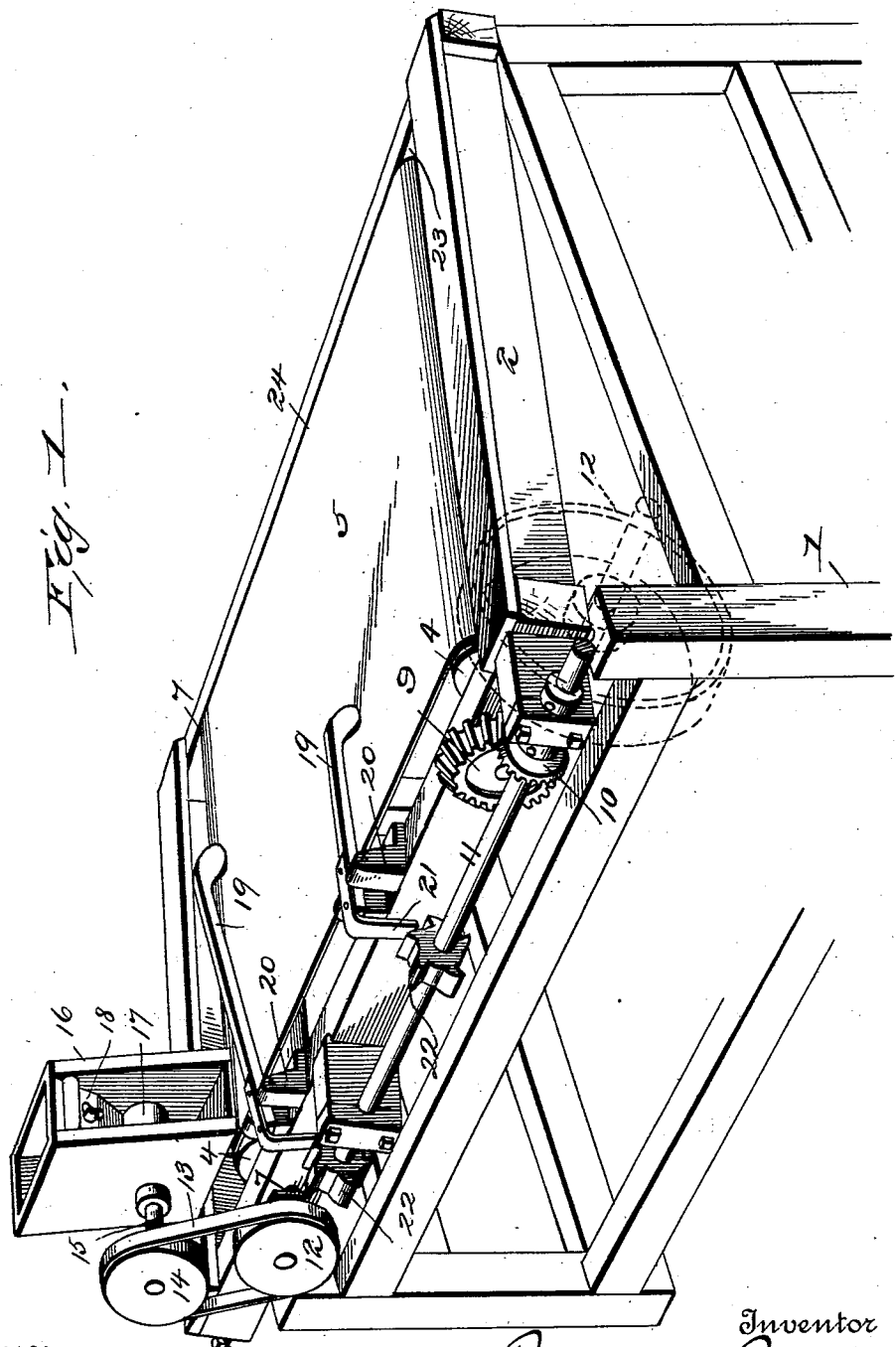

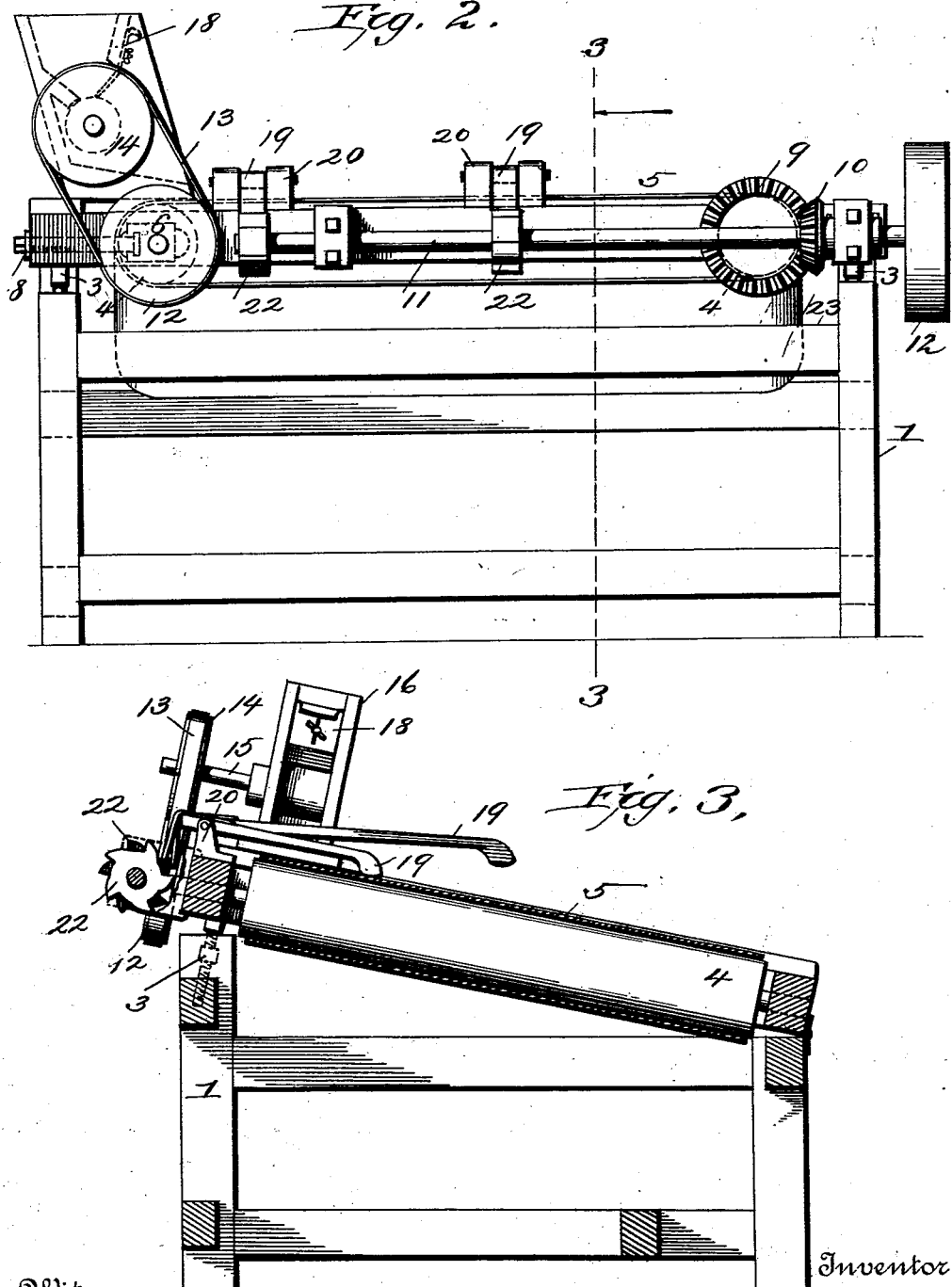

FAUSTIN PRINZ, OF MILWAUKEE, WISCONSIN, ASSIGNOR TO ADOLPH LOUIS KERN, OF SAME PLACE.

MACHINE FOR SEPARATING PEAS AND ROUND SEEDS FROM BROKEN BARLEY, &c.

SPECIFICATION forming part of Letters Patent No. 563,238, dated June 30, 1896.

Application filed April 17, 1895. Serial No. 546,006. (No model.)

*To all whom it may concern:*

Be it known that I, FAUSTIN PRINZ, a subject of the Emperor of Germany, residing at Milwaukee, in the county of Milwaukee and State of Wisconsin, have invented certain new and useful Improvements in Machines for Separating Peas and Round Seeds from Broken Barley or other Material; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a machine for separating peas and round seeds from broken barley or other material, and it has for its object to provide simple and efficient means for satisfactorily making the separations.

The machine considered in its general construction comprises an endless traveling rubber apron inclined in the opposite direction or at right angles to its line of travel, so that the material to be separated after being received upon the apron will be carried by the movement of the apron to one end of the machine while the peas and other round seeds will roll down the incline of the apron and be discharged or delivered at the lower end. I have found from my experience in the working of these machines that in order to effect a satisfactory separation of the peas and round seeds from the broken barley and other material it is essential to impart a positive blow against the apron as distinguished from a lateral shaking motion and from an easy undulatory motion, such as would be imparted by a revolving angular-shaped bar. By employing a traveling inclined rubber apron in connection with knockers adapted to impart a positive blow to said rubber apron, the mixed material is so agitated and opened up that the peas and round seed are given an opportunity to disengage themselves from the particles of broken barley and other material and roll down the incline of the apron away from the barley and other material while the latter will be carried by the apron to the end thereof and discharged.

To the accomplishment of the foregoing object and such others as may hereinafter appear the invention consists in the construction and the combination of parts hereinafter particularly described and then sought to be specifically defined by the claims, reference being had to the accompanying drawings, forming a part hereof, in which—

Figure 1 is a perspective of a machine. Fig. 2 is a side view thereof, and Fig. 3 a transverse vertical section on the line 3 3 of Fig. 2.

In the drawings the numeral 1 designates the main stationary frame of the machine, and numeral 2 an auxiliary frame suitably hinged thereto along one side and sustained at the opposite side in a suitable manner to permit it to be elevated and lowered so as to change the inclination thereof. For instance, it may be sustained by adjusting-screws 3 of well known constructions, so as to raise or lower that side of the frame.

The frame 2 has journaled in it at opposite ends the rollers 4, around which passes an endless apron 5, formed of rubber. One of the rollers 4 is journaled in suitable boxes adapted to move so as to take up any slack in the rubber apron 5 and keep the same taut. For instance, said adjustable roller may be journaled in slidable boxes 6, movable in slots or ways formed in the side pieces 7 of the frame 2 and capable of movement back and forth by means of adjusting-screws 8 of ordinary construction swiveled at one end to the boxes 6, but any other construction to effect the same object may be employed.

On the shaft of one of the rollers 4 is a bevel-wheel 9, with which meshes a bevel-pinion 10, keyed to a driving-shaft 11, to which will be secured, as shown by dotted lines in Fig. 1, a driving-pulley 12. These bevel-wheels transmit motion to the roller 4 and from it by the apron 5 to the other roller 4, which will have secured to its shaft a pulley 12, from which passes a belt 13 to a pulley 14 on a shaft 15, which passes through the sides of a feed-hopper 16, from which the material is fed in a thin stream to the upper corner of one end of the apron 5, the material being fed from the hopper by a roller 17 on the shaft 15, which lies beneath an opening in the bottom of the hopper, as illustrated clearly in Fig. 2, the width of which opening may be controlled by a slide-valve 18, so as to regulate the flow of the material from the hopper. As the material passes from the hopper onto the apron 5 it is carried by the latter in its travel toward the opposite end, and inasmuch as the apron inclines from the upper side to the lower side, say at a pitch of about two inches to one foot, the material will slide from the upper edge toward the lower edge of the apron in a thin sheet. For the purpose of agitating and opening up the material while on the apron, so as to give the peas and other round seed an opportunity to disengage themselves from the broken barley and other material, in order that when thus freed the peas and round seed may roll to the lower edge of the apron while the barley and other material are carried to the end of the machine, I provide one or more knockers adapted to impart a positive blow against the apron, so that this positive blow in conjunction with the rebound afforded by the rubber apron will so agitate the material that the peas and round seed will separate themselves from the barley and other material and roll to the lower edge of the inclined apron, as stated.

When the rubber belt is used in connection with the knockers, there is not only obtained the lifting action on the material due to the rebound of the rubber, but I also secure the movement of the material in radial lines upon the surface of the apron at and adjacent to the point where the knocker imparts its positive blow. This is produced by the stretching of the rubber from a radius around the point of contact between the knocker and apron to the point of contact of the knocker, and then the quick and forcible retraction or resumption of the stretched portion to its normal condition when the knocker is released from contact with the apron, which will throw the grain in radial lines on the apron from the point of contact of the knocker with the apron, the rebound at the same moment lifting the material. As the result the material is opened up to such an extent that the peas and round seeds are given an opportunity to separate from the angular seed or broken grain, and hence a thorough separation of the grain. In order to obtain this satisfactory operation and separation, it is necessary that there should be used both the rubber of the apron and the blow of the knocker. The rubber apron without the knockers will not give the result, and the knockers with an apron of other material than rubber will not give the result. It is only when the two are combined and the apron is inclined in the opposite direction to its line of travel that a satisfactory separation can be effected. These knockers may be arranged in any suitable manner to impart a blow to the apron on which the material lies. In the drawings I have illustrated two knockers designated by the numerals 19, but I do not confine myself to any number, as the number may be varied according to the dimensions of the rubber apron.

As one form of arrangement suitable for the purpose I have illustrated the knockers 19 as pivoted in brackets 20, secured to the upper side piece 7 of the movable frame, each knocker being shown as formed with a depending finger or arm 21, which may be of spring or other metal, and which lies in the path of a cam 22, secured to the shaft 11, so that as said shaft is rotated the cams will be brought against the depending fingers of the knockers, and thus elevate the knockers, in order that when the cams leave the fingers the knockers will contact with the rubber apron and impart a sharp blow thereagainst. The faces of the cams may be so arranged that the knockers will strike their blows against the apron at different times. Inasmuch as the material as it moves from one end to the other of the apron will slide from the upper to the lower edge of the inclined apron, the knockers, when a series of them are employed, should be of different lengths, so that the blows will be imparted at different points from the upper to the lower inclined edge of the rubber apron. The barley and other material which are carried to the end of the apron in the travel of the latter will be discharged through the space at the opening 23 between the roller and the end of the frame while the peas and other round seeds will fall off from the lower edge of the frame at 24.

It will be observed that all the driving mechanism and operative parts are sustained by the auxiliary hinged frame, so that in the change of inclination of the apron by raising or lowering the auxiliary frame the several parts will be retained in their proper operative relation.

I have illustrated and described what I consider to be the best construction of the several parts and their relative arrangement, but it is obvious that changes can be made therein without departing from the essential features of my invention.

Having described my invention and set forth its merits, what I claim is—

1. In a machine for separating peas and other round seeds from broken barley and other material, the combination of an endless traveling elastic rubber apron inclined transversely to its line of travel, a knocker for imparting a positive blow to said apron, and means for periodically actuating said knocker, substantially as and for the purposes described.

2. In a machine for separating peas and other round seeds from broken barley and other material, the combination of an endless traveling elastic rubber apron inclined transversely to its line of travel, a series of knockers of different lengths arranged to impart positive blows to the apron at different points between the upper and lower edge of said inclined apron, and means for periodically actuating said knockers, substantially as and for the purposes described.

3. In a machine for separating peas and other round seeds from broken barley and other material, the combination of a hinged frame, an endless traveling elastic rubber apron supported by rollers mounted in said frame, a periodically-actuated knocker for imparting a positive blow to said apron, and means for elevating and lowering one side of said frame to incline said apron transversely to the line of its travel, substantially as and for the purposes described.

4. In a machine for separating peas and other round seeds from broken barley and other material, the combination of an endless traveling elastic rubber apron, rollers for sustaining said apron, one of the rollers being adjustable to regulate the tension of the apron, a knocker for imparting a positive blow to the apron, a shaft with a cam for actuating said knocker, driving mechanism for said several parts, and an adjustable hinged frame carrying said several parts and adapted in its adjustment to incline said apron transversely to the line of its travel, substantially as and for the purposes described.

In testimony whereof I affix my signature in presence of two witnesses.

FAUSTIN PRINZ.

Witnesses:
H. J. RIEMENSCHNEIDER,
NIC LEIDGEN.